United States Patent [19]

Kitagawa et al.

[11] Patent Number: 5,496,863

[45] Date of Patent: Mar. 5, 1996

[54] METHOD OF CROSSLINKING RUBBER AND PLASTIC MOLDINGS

[75] Inventors: Yoshihiko Kitagawa; Tadashi Jinno; Masashi Aoshima; Taisuke Okita, all of Osaka; Hideo Shinonaga, Chiba; Kaoru Kitadono, Shiga, all of Japan

[73] Assignee: Sumitomo Chemical Company, Ltd., Osaka, Japan

[21] Appl. No.: 667,366

[22] Filed: Mar. 12, 1991

Related U.S. Application Data

[63] Continuation of Ser. No. 291,399, Dec. 27, 1988, abandoned, which is a continuation of Ser. No. 73,332, Jul. 13, 1987, abandoned, which is a continuation of Ser. No. 786,022, Oct. 10, 1985, abandoned.

[30] Foreign Application Priority Data

| Mar. 4, 1985 | [JP] | Japan | 60-42462 |
| Jun. 11, 1985 | [JP] | Japan | 60-126716 |
| Jun. 11, 1985 | [JP] | Japan | 60-126717 |

[51] Int. Cl.$^6$ .................................................. C08J 9/00
[52] U.S. Cl. .................. 521/50.5; 522/3; 522/117; 264/54; 264/470
[58] Field of Search ............... 264/22, 54; 521/50.5; 522/3, 117

[56] References Cited

U.S. PATENT DOCUMENTS

| 2,914,450 | 11/1959 | Hammesfahr | 522/3 |
| 3,013,957 | 12/1961 | Waddington | 521/50.5 |
| 3,247,012 | 4/1966 | Burlant | 522/3 |
| 3,293,108 | 12/1966 | Nairn | 428/159 |
| 3,455,337 | 7/1969 | Cook | 522/161 |
| 3,563,871 | 2/1971 | Newman | 521/50.5 |
| 3,580,829 | 5/1971 | Lanza | 522/117 |
| 3,717,559 | 2/1973 | Oyama | 521/50.5 |
| 3,992,241 | 11/1976 | Ferrari | 522/3 |
| 4,032,606 | 6/1977 | Solomatin | 521/50.5 |
| 4,038,350 | 7/1977 | Jaques | 521/50.5 |
| 4,062,998 | 12/1977 | Hagiwara | 428/383 |
| 4,178,220 | 12/1979 | Fowler | 522/3 |
| 4,221,253 | 9/1980 | Seiberling | 522/3 |
| 4,367,185 | 1/1983 | Nojiri | 264/22 |
| 4,434,251 | 2/1984 | Sasajima | 521/50.5 |
| 4,447,488 | 5/1984 | Simm | 428/422 |
| 4,483,808 | 11/1984 | Dillow | 264/22 |
| 4,491,616 | 1/1985 | Schmidle | 427/44 |
| 4,510,031 | 4/1985 | Matsumura | 521/50.5 |
| 4,510,303 | 4/1985 | Oda et al. | 526/169.2 |
| 4,525,297 | 6/1985 | Yamane | 521/50.5 |

OTHER PUBLICATIONS

Nitto, "Foamable Olefinic—", Derwent Abstract 83-38135k/16, Apr. 1983.
Sekisui, "Crosslinked Polyolefin—", Derwent Abstract 84-297694/48, Oct. 1984.
Patent Abstracts of Japan, vol. 7, No. 207, Sep. 13, 1983, p. 113 M 242: and JP-A-58 104 726 (Aishin Seiki K.K.) 22 Jun. 1983.
Patent Abstracts of Japan, vol. 10, No. 123, May 8, 1986, p. 74 C 344; & JP-A-60 248 747 (Sumitomo Kagaku Kogyo K.K.) Sep. 12, 1985.
Patent Abstracts of Japan, vol. 7, No. 122, May 26, 1983, p. 122 C 168; & JP-A-58 42 630 (Nitto Denki Kogyo K.K.) Dec. 3, 1983.
Patent Abstracts of Japan, vol. 9, No. 46, Feb. 27, 1985, p. 24 M 360; & JP-A-59 184 629 (Sekisui Kagaku Kogyo K.K.) Oct. 20, 1984.
Patent Abstracts of Japan, vol. 5, No. 183, Nov. 21, 1981, p. 89 M 97; & JP-A-56 104 037 (Toyo Rinoriyuumu K.K.) Aug. 19, 1981.
Patent Abstracts of Japan, vol. 5, No. 188, Nov. 27, 1981, p. 127 C 81; & JP-A-56 112 941 (Hitachi Kasei Kogyo K.K.) Sep. 5, 1981.

*Primary Examiner*—Mark Chapman
*Attorney, Agent, or Firm*—Sughrue, Mion, Zinn, Macpeak & Seas

[57] ABSTRACT

A method of crosslinking a rubber or plastic molding is described, which comprises irradiating the molding with electron beams to thereby limitedly crosslink only the surface of the molding. The molding thus-treated has excellent shape-sustaining properties and good surface appearance. Thus it is expected to find many applications in various fields.

12 Claims, 1 Drawing Sheet

METHOD OF CROSSLINKING RUBBER AND PLASTIC MOLDINGS

This is a continuation of application Ser. No. 07,291,399, filed Dec. 27, 1988, now abandoned, which is a continuation application of U.S. application Ser. No. 07/073,332, filed Jul. 13, 1987, now abandoned, which is a continuation application of U.S. application Ser. No. 06/786,022, filed Oct. 10, 1985 now abandoned.

FIELD OF THE INVENTION

The present invention relates to a method of crosslinking rubber and plastic moldings having improved properties in surface and shape.

BACKGROUND OF THE INVENTION

Rubber and plastic articles (hereinafter abbreviated to "articles") are widely used as automobile and bicycle parts, various industrial articles, building materials, and so forth. In these fields, the articles are used as unexpanded or expanded materials or combinations of these materials, or combinations thereof with different materials such as metals. One of important characteristics required for such articles is that the articles have good surface properties and stable shape.

The surface properties of the article referred to herein include not only properties concerning external appearance such as surface smoothness, luster, and vivid color but also mechanical properties such as surface hardness, wear resistance, scratch resistance, and low friction resistance as well as chemical properties such as oil resistance and organic solvent resistance.

These properties are important for the article regardless of whether the article is expanded or unexpanded. In particular, they are important when the article is in the expanded form (which is also called "a sponge article"). That is, in the case of such an expanded article, unevenness is liable to develop in the surface thereof during the production thereof. As a result, a beautiful surface having smoothness and luster can be hardly obtained. Also, if blowing agents or decomposition products thereof go out through the surface from the molding during the process of expansion, water absorbing resistance and wear resistance are lost and at the same time, soft touch cannot be obtained.

Another problem is that non-crosslinked rubber and plastic moldings cannot retain their desired forms during the process of production thereof because of their own weight, deformation and distortion.

In the industrial production of stabilized article surface, the production of expanded articles is more difficult than the produciton of unexpanded articles. This is considered due to the fact that the production of expanded articles requires addtionally an unstable step of exapansion.

SUMMARY OF THE INVENTION

The present invention is intended to overcome the above problems encountered in the production of the above articles. In accordance with the present invention, in crosslinking of rubber and plastic moldings, the moldings are irradiated with electron beams so as to crosslink only the surface layer of the moldings.

An object of the present invention is, therefore, to provide a method of crosslinking rubber and plastic moldings which comprises limitedly crosslinking only the surface layer of the molding by irradiating it with electron beams.

BRIEF DESCRIPTION OF THE DRAWINGS

In the drawings, 1 indicates a molding to be irradiated with electron beams, 2 indicates a direction in which the irradiation with electron beams is applied, and $\alpha$ indicates an angle of the irradiation with electron beams.

DETAILED DESCRIPTION OF THE INVENTION

As can be understood from the object that only the surface layer is limitedly crosslinked, electron beams which are applied are sufficient to be of relatively low level. They are electron beams which can be applied at a low dose and accelerated at a low electron voltage. In more detail, it is suitable that the irradiation dose is not more than 50 Mrad and the electron voltage is not more than 3,000 kV.

Only the surface layer of the molding is limitedly crosslinked by irradiating with electron beams at a relatively low level. Thus, a molding in which the inner portion thereof is not crosslinked and is soft whereas the surface layer thereof is hardened can be obtained. A major principle of the method of the present invention is as described above. It has been found that the method of the present invention can find many applications and is of great practical value. This means that, as described above, the present invention yields the effects that the surface properties of article are greatly improved and that the stable retention of the article shape is greatly improved. In the method of the present invention, the moldings per se are not critical, but rubber and plastic moldings having crosslinking properties are appropriately used. In addition, moldings having a crosslinkable surface layer are suitable for use in the method of the present invention.

When non-crosslinked compounds molded into a desired shape by extrusion molding, for example, are irradiated with electron beams, the surface layer thereof is hardened in such a condition that the shape and surface properties as obtained by the extrusion molding are retained. That is, the shape and surface properties are fixed in the original condition.

That is, when the surface of the non-crosslinked extrusion molding is very smooth, only the surface is crosslinked while retaining the smoothness, and the smooth surface is fixed.

In the case that the shape of a die for extrusion of a non-crosslinked molding is circular so as to extrude, for example, a cyclindrical pipe, when the molding which has just left the die is irradiated with electron beams, the surface of the pipe is hardened while retaining its original shape and, as a result, deformation of the pipe is prevented.

In order to make the above effect more marked, it is effective to provide a crosslinkable surface layer on the molding. This method of providing such a crosslinkable surface layer is not critical, but a coextrusion method and a coating method can be suitably employed. The present invention also includes an improvement of the surface properties by applying irradiation with electron beams after the rubber and plastic moldings have been crosslinked by conventional methods.

The action and effect of the present invention will hereinafter be explained in detail.

The method of the present invention can be applied more effectively to the expansion of rubber and plastic moldings. Since expanded articles having a smooth surface are difficult to produce, it has been especially desired to develop a method of producing expanded articles having improved surface properties, and such a method is industrially important.

These expanded articles are produced by preliminarily molding crosslinkable rubber and plastic compositions containing a blowing agent by means of, e.g., an extruder, a calender roll, a roll, or a press, and then heating the resulting moldings by heat press or in a heating oven such as a hot air oven, a molten salt medium, a fluidized bed medium, a high frequency appliance, and a steam pipe, to thereby achieve the crosslinking and expansion with good timing.

In the method, however, if the crosslinking is carried out excessively in relation to the expansion, the expansion is attained only after the viscosity of the compound has increased and, therefore, it is difficult to obtain a high expansion rate (low density). Furthermore, a rate of crosslinking greatly varies with kneading conditions of non-crosslinked rubber and plastic mixture, and also, the density of the expanded article varies with even a slight difference in heating conditions. Thus, it is difficult to retain stabilized shape and performance, and this will lead to an increase in the level of defectiveness of products (reduction in productivity). If the rate of crosslinking is low, the crosslinking and expansion can be well balanced with ease, and the level of defectiveness can be reduced. However, another problem that the surface appearance is degraded occurs.

Another important factor from an industrial standpoint is to produce expanded articles having a expected performance and good surface appearance in high yield and with high productivity.

For this purpose, in conventional methods of producing expanded articles, it is necessary to control the rate of crosslinking and the rate of expansion with high accuracy. This is a difference of the method of production of expanded articles from that in the case of unexpanded articles wherein it is a single requirement to pay an attention to the rate of crosslinking. Thus, for this reason, high level techniques are required in the former case.

In view of the above circumstances, the present inventors have made extensive investigations on a method to produce rubber and plastic articles having good surface appearance with ease without reducing the characteristics and productivity thereof, and accomplished the present invention.

In accordance with the present invention, a surface of a molding of a non-crosslinked rubber and plastic composition containing a blowing agent is irradiated with electron beams at an irradiation dose of not more than 50 Mrad and at an electron voltage of not more than 3000 kV, to form a crosslinked surface layer, and the molding is then heated to complete the crosslinking and expansion, whereupon an expanded rubber and plastic article having an improved surface appearance can be obtained.

In the method of the present invention, since the surface of a molding of a non-crosslinked rubber and plastic composition containing a blowing agent and a crosslinking agent is irradiated with electron beams to form a crosslinked skin of the molding, and then, the crosslinking and expansion of the molding are conducted by heating, the surface of the expanded article can be made smooth regardless of the rates of crosslinking and expansion and a balance therebetween.

There are no special limitations to the method of preparing a non-crosslinked rubber and plastic composition for expanded articles used in the present invention. As in conventional methods of the preparation of expanded rubber materials, such compositions can be prepared by kneading rubber material, resin, reinforcing filler, loading filler, softening agent, blowing agent, crosslinking agent, crosslinking accelerator, stabilizer, and so forth by the use of a kneader such as a Banbury mixer, a kneader mixer, and a mixing roll.

The starting material which can be used is not critical. Rubbers and thermoplastic elastomers such as styrene-butadiene rubber (SBR), polyisoprene rubber (IR), polychloroprene rubber (CR), acrylonitrile-butadiene rubber (NBR), polybutadiene rubber (BR), ethylene-propylene rubber (EPR), ethylene-propylene-non-conjugated diene terpolymer rubber (EPT), and acrylic rubber (ACM), natural rubber (NR), polyethylene, chlorinated polyethylene, ethylene-vinyl acetate copolymer, ethylene-α-olefin copolymer, etc. can be used alone or in blends.

Typical examples of the blowing agent are dinitrosopentamethylenetetramine, azodicarbonamide, and p,p'-orthobisbenzenesulfonylhydrazine. Other blowing agents can also be used.

The method of crosslinking the rubber and plastic composition for expanded articles is not critical and any of sulfur vulcanization, crosslinking using peroxides, crosslinking using quinoids, and so forth can be employed.

In the non-crosslinked rubber and plastic composition used in the present invention, prevailing additives such as reinforcing filler, loading filler, softening agent, crosslinking accelerator, coloring agent, stabilizer, antioxidant, and so forth can be used.

Such a non-crosslinked rubber and plastic composition is molded into a desired shape by preliminary molding. This molding method is not critical and any known techniques using an extruder, a calender roll, a press, a roll, and so forth can be emloyed.

In the conventional methods, such a molding is then transferred to the subsequent step of crosslinking and expansion without any additional treatment. On the other hand, the method of the present invention is characterized in that the surface of the molding is irradiated with electron beams prior to the expansion, to form a crosslinked surface layer (crosslinked skin layer).

In the irradiation with electron beams, the optimum electron voltage and irradiation dose vary with the type of the starting material for the composition, the type of compounding ingredients, the compounding ratios, and so forth, and thus, they can be determined appropriately taking into consideration the above factors. The thickness of the crosslinked skin layer formed on the surface of the molding is influenced by the electron voltage of electron beams. That is, as the electron voltage is increased, the thickness of the skin layer is increased.

In the present invention, the electron voltage is usually not more than 3,000 kV and preferably from 10 to 500 kV. The thickness of the skin layer formed at an electron voltage falling within the above range varies with the type of the composition. In general, the thickness is in the range of several microns to several hundred microns. If the electron voltage is too low, the thickness of the crosslinked skin layer is not sufficient. On the other hand, if the electron voltage is too high, the thickness of the crosslinked skin layer is excessively increased. In any of these cases, a satisfactory rubber expanded article cannot be obtained.

The degree of crosslinking of the crosslinked skin layer varies with the dose of electron beams irradiated. In the present invention, the irradiation dose is important. If the irradiation dose is too small, the skin layer cannot be sufficiently crosslinked, and the effect to improve the surface appearance is small. On the other hand, if the irradiation dose is too great, the crosslinking proceeds excessively and the strength of the skin layer is increased, whereby the expansion is often prevented in the skin layer. The dose of electron beams irradiated in the present invention is usually not more than 50 Mrad and preferably from 1 to 30 Mrad.

After the crosslinked skin layer has been formed on the surface of the molding by irradiation with electron beams, the crosslinking and expansion of the molding are completed by heating.

For the crosslinking and expansion, conventionally used heating apparatus can be used. For example, a heat press, a hot air oven, a molten salt medium, a fluidized bed medium, a high frequency applicance, a steam pipe, and other heating units can be used. It is to be noted that the present invention is not limited to the above apparatus, however. If desired, two or more heating systems can be applied in combination.

The heating temperatures for the crosslinking and expansion are the crosslinking temperature and the expansion temperature or higher, respectively, and they are chosen appropriately depending on the conditions employed.

One of industrially important applications of the present invention is the production of expanded rubber articles and their composite articles.

If the method of the present invention is applied to even an unvulcanized rubber composition having a rate of vulcanization smaller than the conventionally used rate of vulcanization, an expanded rubber article having a good surface appearance can be obtained. Accordingly, during the process of the production of expanded rubber articles, a difference in density can be decreased, and the rate of defectiveness can be reduced. Moreover, since the crosslinked layer is formed in the surface prior to the decomposition of the blowing agent, the flow of decomposed gases of the blowing agent through the surface can be markedly decreased. Thus an expanded rubber article having a lower density can be produced using the same amount of the blowing agent.

One of the characteristic features of the present invention resides in that an expanded article having a good surface appearance can be produced using a non-crosslinked rubber composition having a low rate of vulcanization which has hitherto been considered unsuitable for the rubber expansion. This feature will hereinafter be explained in more detail.

One application is the production of an expanded article using an ethylene-α-olefin-dicyclopentadiene rubber. For example, the rate of vulcanization of an ethylene-propylene-dicyclopentadiene rubber is smaller than that of an ethylene-propylene-ethylidene norbornene rubber. Accordingly, in the conventional method wherein in order to produce a good surface condition, the rate of vulcanization must be higher than that of expansion, the ethylene-propylene-ethylidene norbornene rubber has exclusively been used. However, if the method of the present invention is applied, a satisfactory expanded article can be produced even by using the ethylene-propylene-dicyclopentadiene rubber as the starting material, without any problems.

Further, it has been found that the effect of the present invention can be applied for general purposes. That is, in the conventional methods of the production of expanded rubber articles, it has been considered to be required to set up the rate of vulcanization at a high level, depending on the rate of decomposition of the blowing agent. For this reason, as a composition for expanded article, a composition having a short scorch time, which is an index of an initiation time of vulcanization, has been considered suitable. In particular, in the case of producing the expanded article by continuous vulcanization or with vulcanizer, in order to make the surface of the expanded article smooth and to eliminate the formation of pin holes due to the release of gases, it is necessary to shorten the scorch time. For this reason, an expanded rubber composition containing an ethylene-α-olefin-non-conjugated diene rubber having a scorch time at 125° C. of less than 5 minutes has been used. However, if the scorch time is shorter, the storage stability and the processing stability during the kneading and molding of the composition are lowered. Accordingly, it has been difficult to meet the requirements for the improvement of the surface appearance and those for the storage stability and processing stability of the non-crosslinked composition at the same time, and thus, the setting of the scorch time has been an important subject.

The method of the present invention solves the above contradiction. That is, in accordance with the present invention, a molding of a non-crosslinked rubber composition having a scorch time of 5 minutes or more is irradiated with electron beams and then heated, to thereby achieve the vulcanization and expansion, so that a rubber and plastic molding having an improved surface appearance can be produced without any problems of storage and processing stabilities. As the starting material, the above-described ones can be used. Other examples are rubber compositions having a relatively low rate of vulcanization, such as an ethylene-α-olefin-non-conjugated diene rubber and other rubbers, or mixtures of such rubbers and resins.

The present invention also relates to a method of uniformly irradiating the surface layer of rubber and plastic moldings with electron beams. A preferred example as a subject of application of the method of the present invention is a molding produced by extrusion. An improved point in application of preliminary crosslinking of the extrusion molding with electron beams is to uniformly irradiate the surface of the extrusion molding having a complicated shape with electron beams.

This uniform irradiation of the surface with electron beams is necessary for the following two reasons. One is to make the surface appearance uniform, and the other is to maintain original shape without deformation. Since electron beams go straight like light, when a molding having a circular cross-section is irradiated with electron beams, it is necessary to irradiate the outer periphery of the molding with electron beams as much as possible.

A method of bending electron beams by the use of a magnet has been devised. This method, however, needs great equipment. On the other hand, in the present invention, only the surface layer is limitedly irradiated with electron beams unlike electric wires in which electron beams are irradiated so as to penetrate through the electric wire. Thus the above method using a magnet is unsuitable in the present invention.

As a result of extensive investigations on a method of improving the surface appearance of the rubber and plastic molding and retaining the extruded shape by the use of an equipment simplified as much as possible, the present invention has been accomplished.

That is, the present invention relates to a method of crosslinking rubber and plastic molding in which only the surface layer of the molding is limitedly irradiated with electron beams by irradiating the molding with the beams from at least two directions.

The method of irradiation with electron beams for the purpose of crosslinking is illustrated in FIGS. 1 to 4.

Figure 1:
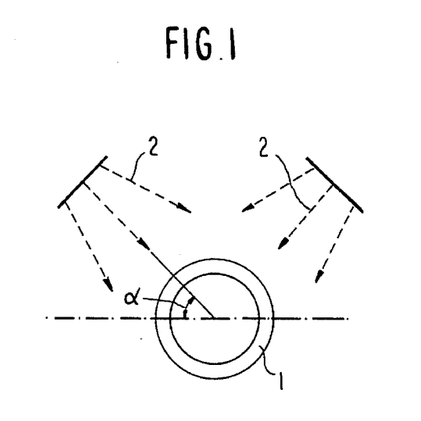
FIGS. 1 to 4 illustrate illustrative methods of irradiation with electron beams according to the method of the present invention.
Figure 2:
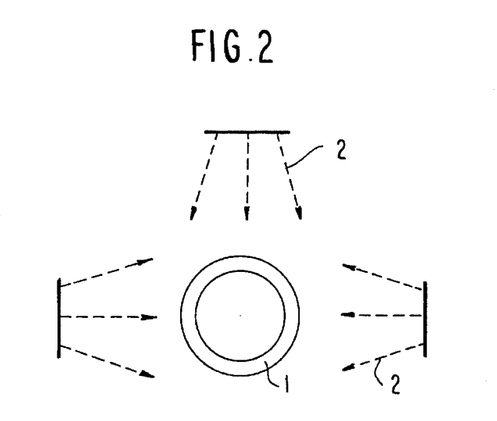
Figure 3:
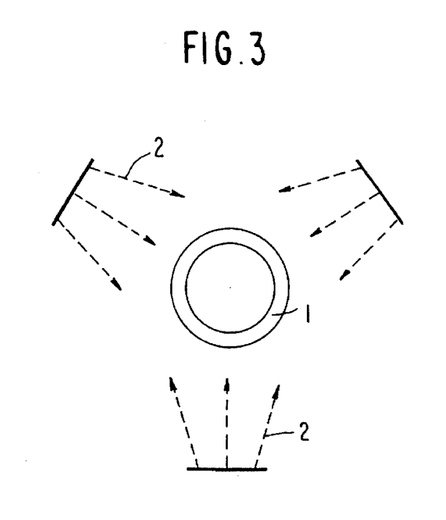
Figure 4:
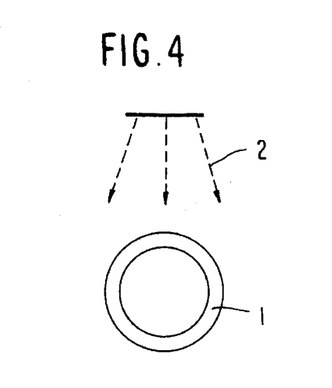

FIG. 4 illustrates a case in which electron beams that go straight are applied on the molding only from one direction. FIGS. 1 to 3 illustrate the method of the multi-directional irradiation, in which FIG. 1 illustrates a case in which electron beams are applied from two directions, and FIGS. 2 and 3 illustrate cases of three-directional irradiation.

The method shown in FIG. 3 is suitable for irradiation of the whole periphery of a molding having a cylindrical, tube-like, or complicated shape. In accordance with the method of FIG. 3, it is possible to irradiate the whole periphery if the effective irradiation width of an irradiated area is set up appropriately.

From the industrial and practical viewpoint, in many cases, the irradiation of the whole periphery with electron beams is not always required even for an extrusion molding. In the case that the irradiation with electron beams is applied for the purpose of preliminarily crosslinking the surface layer so as to improve the smoothness, appearance or wear resistance of the surface, only the properties of a surface which can be seen or which comes into contact with other article is of importance. For example, in the case of a rubber expanded article used in sealing of an automobile door, the properties such as appearance and wear strength of the surface area bonded to the automobile body can be often ignored. In this case, it suffices that as illustrated in FIG. 1 or 2, the molding is partially irradiated with electron beams.

In the method of the present invention, it is preferred that the irradiation with electron beams be applied from two or three directions. Particularly for a molding in which partial irradiation of one side is needed and which has a complicated shape, the two-directional irradiation is preferred.

In such a case from the viewpoint of uniform irradiation, the two-directional irradiation is sometimes superior to the three-directional irradiation. The reason for this is considered due to the fact that in the case of the three-directional irradiation, the degree of irradiation is partially high and, therefore, uniform irradiation is rather prevented.

Advantages of the method shown in FIG. 1 in which the surface area of one side is partially irradiated with electron beams will become clear from the following examples.

In the case of an extrusion molding, for example, it is preferred to employ a method in which electron beams are applied from two directions each at an angle of 45°±30° from the axis extending upward in relation to the horizontal plane passing through the center of the rubber and plastic molding (the angle $\alpha$ of FIG. 1 is 45°±30°).

The dose and electron voltage can be determined appropriately depending on the purposes. Since the object of the present invention is to crosslink the surface layer, it can be attained by irradiation with electron beams in which the dose is relatively low and the electron voltage is relatively low.

The irradiation dose is not more than 50 Mrad and preferably from 1 to 30 Mrad. The electron voltage is not more than 3,000 kV and preferably from 10 to 500 kV. Within these ranges, satisfactory crosslinking can be achieved.

Although an extrusion molding that is produced by continuous processing is suitable for use in the method of the present invention, the present invention is not limited thereto, and the method of the present invention can be utilized in continuous or batchwise irradiation with electron beams of moldings produced by various methods.

Rubber and plastic articles to which the method of the present invention can be effectively applied include an expanded or an unexpanded material of rubber, a composite material of an expanded rubber material and an unexpanded rubber material, a composite material of an expanded rubber material, an unexpanded material and a metal, and a rubber material covered with a plastic surface or expanded or unexpanded plastic material.

In the method of the present invention, as the rubber and plastic molding, a molding having a thin surface layer comprising a crosslinkable component can be used. The method of forming a crosslinkable surface layer includes a coextrusion method and a coating method. As the molding to which the method of the present invention is to be applied, an expanded material, an unexpanded material, or a composite material comprising an expanded material and an unexpanded material. By application of the method of the present invention, a molding having excellent shape-retaining properties during the extrusion can be obtained.

By selecting a suitable surface layer material, characteristics such as excellent smoothness, luster, appearance, surface hardness, wear resistance, scratch resistance, low friction resistance, oil resistance, and organic solvent resistance can be imparted to the surface of the molding. Thus the ultimate product is more incresed in practical value.

The material forming the crosslinkable surface layer is not critical. For example, an unsaturated polyester resin, a urethane resin, an epoxy resin, an acrylic resin, a urethane-acrylic resin, a melamine-acrylic resin, an acrylated polyester resin, an epoxy-acrylic resin, and the like can be used alone or in combination.

There can be further incorporated therein coloring materials such as pigments and dyes, fillers, and additives. When it is necessary to crosslink also the inner layer portion, this is carried out before or after the crosslinking of the crosslinkable surface layer by irradiation with electron beams.

The present invention is described in detail with reference to the following examples.

EXAMPLES 1 TO 3 AND COMPARATIVE EXAMPLE 1

The effect of improvement in surface properties of an expanded article of an ethylene-propylene-ethylidene norbornene rubber according to the method of the present invention is shown in these examples.

A composition shown in Table 1 was kneaded by the use of a Banbury mixer and a mixing roll to prepare an ethylene-propylene-ethylidene norbornene rubber composition for the preparation of an expanded article.

This rubber composition was extruded in the form of a tube through an extruder. After irradiation of the surface of the extrudate with electron beams, the extrudate was heated at 230° C. for 5 minutes in a hot oven to conduct vulcanization and expansion, whereupon an expanded rubber article was obtained.

TABLE 1

| Formulation | Amount (parts by weight) |
| --- | --- |
| Esprene ® 505*1 | 100 |
| Zinc oxide | 5 |
| Stearic acid | 1 |
| FEF carbon black | 70 |
| Calcium carbonate | 40 |
| Paraffin oil | 40 |
| p,p-Oxybisbenzenesulfonyl-hydrazine | 3 |
| Soxinol ® BZ*2 | 2.0 |
| Soxinol ® TRA*2 | 1.0 |
| Soxinol ® M*2 | 2.0 |
| Sulfur | 1.5 |

Note:
*1Ethylene-propylene-ethylidene norbornene rubber (produced by Sumitomo Chemical Company, Limited)
*2Vulcanization accelerator (produced by Sumitomo Chemical Company, Limited)

The expanded article of the rubber was evaluated for surface appearance. The results are shown in Table 2 along with its apparent specific gravity.

TABLE 2

| | Dose of Electron Beams Irradiated (Mrad) | Surface Appearance of the Expanded Article*2 | Apparent Specific Gravity of the Expanded Article |
| --- | --- | --- | --- |
| Comparative Example 1 | — | Δ | 0.522 |
| Example 1 | 2 | ⊚ | 0.521 |
| Example 2 | 5 | ⊚ | 0.519 |
| Example 3 | 10 | ⊚ | 0.520 |

Note:
*1Electron voltage: 250 kV
*2The surface appearance of the expanded article was rated as follows:
⊚: Excellent
o: Good
Δ: Fair It can be seen from the results of Table 2 that irradiation with electron beams greatly improves the surface appearance of the expanded rubber article without any change of a degree of expansion. That is, the effect of the present invention is great.

EXAMPLE 4 AND COMPARATIVE EXAMPLE 2

A composition shown in Table 3 was kneaded by the use of a Banbury mixer and a mixing roll to prepare an ethylene-propylene-dicyclopentadiene rubber composition.

This rubber composition was extruded in the form of a tube by the use of a 45 mmø extruder (die: 100° C.). After irradiation of the surface of the extrudate with electron beams, the extrudate was heated at 230° C. for 5 minutes in a hot air oven to achieve vulcanization and expansion, whereupon an expanded article of the rubber was obtained.

TABLE 3

| Formulation | Amount (parts by weight) |
| --- | --- |
| Esprene ® 305*1 | 100 |
| Zinc oxide | 5 |
| Stearic acid | 1 |
| FEF carbon black | 80 |

TABLE 3-continued

| Formulation | Amount (parts by weight) |
| --- | --- |
| Calcium carbonate | 40 |
| Paraffin oil | 40 |
| p,p-Oxybisbenzenesulfonyl-hydrazine | 3 |
| Soxinol ® BZ*2 | 1.5 |
| Soxinol ® TRA*2 | 1.0 |
| Soxinol ® *2 | 1.0 |
| Sulfur | 1.5 |

Note:
*1Ethylene-propylene-dicyclopentadiene rubber (produced by Sumitomo Chemical Company, Limited)
*2Vulcanization accelerator (produced by Sumitomo Chemical Company, Limited)

The expanded article of the rubber was evaluated for surface appearance. The results are shown in Table 4 along with its apparent specific gravity.

TABLE 4

| | Dose of Electron Beams Irradiated (Mrad) | Surface Appearance of the Expanded Article*2 | Apparent Specific Gravity of the Expanded Article |
| --- | --- | --- | --- |
| Example 4 | 5 | ⊚ | 0.47 |
| Comparative Example 2 | — | x | 0.56 |

Note:
*1Electron voltage: 200 kV
*2The surface appearance of the expanded article was rated as follows:
⊚: Excellent
o: Good
Δ: Fair
x: Poor It can be seen from the results of Table 4 that a sponge having a good surface appearance, a high degree of expansion, and a low apparent specific gravity which has been considered to be impossible to produce from an ethylene-propylene-dicyclopentadiene rubber can be easily produced by applying the method of the present invention.

EXAMPLES 5 TO 8 AND COMPARATIVE EXAMPLES 3 TO 6

In these examples, blends of an ethylene-propylene-dicyclopentadiene rubber and an ethylene-propylene-ethylidene norbornene rubber were used.

TABLE 5

| Formulation | Amount (parts by weight) |
| --- | --- |
| Ethylene-propylene-dicyclopentadiene rubber*1 Ethylene-propylene-ethylidene-norbornene rubber*2 | 100 |
| Zinc oxide | 5 |
| Stearic acid | 1 |
| FEF carbon black | 100 |
| Calcium carbonate | 40 |
| Paraffin oil | 55 |
| p,p-Oxybisbenzenesulfonyl-hydrazine | 3 |
| Soxinol ® BZ*3 | 1.5 |
| Soxinol ® TE*3 | 0.7 |
| Soxinol ® M*3 | 2.0 |

TABLE 5-continued

| Formulation | Amount (parts by weight) |
|---|---|
| Sulfur | 1.5 |

Note:
*[1]Ethylene-propylene-dicyclopentadiene rubber (Mooney viscosity, $ML_{1+4}$ (100° C.): 70, propylene content: 35 wt %, iodine value: 20)
*[2]Ethylene-propylene-ethylidene norbornene rubber (Mooney viscosity, $ML_{1+4}$ (100° C.): 73, propylene content: 40 wt %, iodine value: 20)
*[3]Vulcanization accelerator (produced by Sumitomo Chemical Company, Limited)

The composition shown in Table 5 was kneaded in the same manner as in Example 1 and then extruded through a 45 mmø extruder using a Garbay die at a die temperature of 100° C. The extrudate was irradiated with electron beams in the same manner as in Example 1 and then vulcanized and expanded in a hot air oven.

The results obtained are shown in Table 6.

TABLE 6

| | Comparative Example 3 | Example 5 | Comparative Example 4 | Example 6 | Comparative Example 5 | Example 7 | Comparative Example 6 | Comparative Example 8 |
|---|---|---|---|---|---|---|---|---|
| Dicyclopentadiene-based EPDM | 100 | | 70 | | 30 | | 0 | |
| Ethylidene norbornene-based EPDM | 0 | | 30 | | 70 | | 100 | |
| Compound Mooney Viscosity $ML_{1+4}$ (100° C.) | 42 | | 42 | | 44 | | 45 | |
| Scorch Time $t_5$ at 125° C. (min) | 7.7 | | 5.8 | | 3.5 | | 3.1 | |
| Dose of Electron Beams (Mrad)*[2] | — | 5 | — | 5 | — | 5 | — | 5 |
| Sponge Characteristics | | | | | | | | |
| Surface Appearance | x | ⊙ | x | ⊙ | o | ⊙ | o | ⊙ |
| State of the Edge Portion*[3] | o | o | o | o | Δ | Δ | x | x |
| Apparent Specific Gravity | 0.57 | 0.48 | 0.54 | 0.51 | 0.54 | 0.53 | 0.56 | 0.56 |

Note:
*[1]Scorch Time: Measured by JIS K6301.
*[2]Electron Voltage: 200 kV.
*[3]Evaluation of extrusion properties using a Garbay die was rated as follows.
⊙: Excellent
o: Good
Δ: Fair
x: Poor It can be seen from the results of Table 6 that when an ethylene-propylene-dicyclopentadiene rubber is irradiated with electron beams, a sponge product having good extrusion properties and surface appearance can be obtained.

In the case that an ethylene-propylene-ethylidene norbornene rubber is used, since its scorch is short, the surface appearance is good even if it is not irradiated with electron beams, but the scorch phenomenon occurs during the process of extrusion and the composition can not be extruded uniformly.

EXAMPLE 9 AND COMPARATIVE EXAMPLES 7 TO 9

A composition shown in Table 7 was kneaded by the use of a Banbury mixer and a mixing roll to prepare a sponge composition comprising an ethylene-propylene-ethylidene norbornene rubber.

TABLE 7

| Formulation | Composition A (part by weight) | Composition B (part by weight) |
|---|---|---|
| Esprene ® 502*[1] | 100 | 100 |
| Zinc oxide | 5 | 5 |
| Stearic acid | 1 | 1 |
| FEF carbon black | 80 | 80 |
| Calcium carbonate | 40 | 40 |
| Paraffin Oil | 60 | 50 |
| p,p-Oxybisbenzenesulfonylhydrazine | 3 | 3 |
| Soxinol ® BZ*[2] | 1.5 | 1.0 |
| Soxinol ® TRA*[2] | 1.0 | 0.5 |
| Soxinol ® M*[2] | 1.5 | 1.0 |
| Sulfur | 1.5 | 1.5 |
| Compound Scorch Time, $t_5$ at 125° C. (min) | 3.6 | 6.2 |

TABLE 7-continued

| Formulation | Composition A (part by weight) | Composition B (part by weight) |
|---|---|---|

Note:
*[1]Ethylene-propylene-ethylidene norbornene rubber (produced by Sumitomo Chemical Company, Limited)
*[2]Vulcanization accelerator (produced by Sumitomo Chemical Company, Limited)

This sponge composition was extruded in the form of a tube by the use of a 45 mmø extruder (tube die: 80° C.).

The surface of the extrudate thus obtained was irradiated with electron beams. Then the extrudate was heated at 230° C. for 5 minutes in a hot air oven to achieve vulcanization and expansion, whereupon a tube-shaped sponge was obtained. The sponge thus obtained was evaluated for surface appearance, apparent specific gravity and extrusion stability. The results are shown in Table 8.

TABLE 8

|  | Comparative Example 7 | Comparative Example 8 | Comparative Example 9 | Example 9 |
|---|---|---|---|---|
| Composition | A | A | B | B |
| Dose of Electron Beams Irradiated*1 (Mrad) | — | 5 | — | 5 |
| Surface Appearance of Expanded Article*2 | o | ⊚ | x | ⊚ |
| Apparent Specific Gravity of Expanded Article | 0.50 | 0.51 | 0.54 | 0.51 |
| Extrusion Stability*2 | x | x | ⊚ | ⊚ |

Note:
*1Electron voltage: 200 kV
*2The surface appearance and molding properties were rated as follows:
⊚: Excellent
o: Good
x : Poor It can be seen from the results of Table 8 that in the composition B having a long scorch time and good molding stability, if electron beams are applied, the surface appearance of the sponge can be greatly improved. In the case of the composition A having a short scorch time, even if electron beams are not applied, the sponge having relatively good surface appearance can be obtained, but the scorch phenomenon occurs and molding stability is poor.

EXAMPLES 10 TO 12 AND COMPARATIVE EXAMPLE 10

In these examples, it is shown that if electron beams are applied from a plurality of directions, the effect of excellent shape-sustaining properties can be obtained.

A composition shown in Table 9 was kneaded by the use of a Banbury mixer and a mixing roll for the preparation of an expanded article.

This rubber composition was extruded in the form of a tube by the use of an extruder. After irradiation of the surface of the extrudate with electron beams, the extrudate was heated at 230° C. for 5 minutes in a hot air oven to accomplish vulcanization and expansion, whereupon an expanded article of the rubber was obtained.

The irradiation with electron beams was applied in three different manners: from one direction, from two directions, and from three directions as shown in FIGS. 4, 1, and 2, respectively. In each of the manners, the electron voltage was 250 kV, and the dose of electron beams irradiated was 10 Mrad.

Each expanded article was evaluated, and the results are shown in Table 10.

It can be understood from the results of Table 10 that the surface appearance can be improved without substantial change in the apparent specific gravity of the expanded article by irradiation with electron beams. In connection with the shape-retaining properties, irradiation from the two directions (FIG. 1) and the three directions (FIG. 2) is effective.

TABLE 9

| Formulation | Amount (parts by weight) |
|---|---|
| Esprene ® 502*1 | 100 |
| Zinc oxide #3 | 5 |
| Stearic acid | 1 |
| FEF carbon black | 80 |
| Calcium carbonate | 40 |
| Paraffin oil | 40 |
| p,p-Oxybenzenesulfonylhydrazine | 3 |
| Sulfur | 1.5 |
| Soxinol ® BZ*2 | 1.5 |
| Soxinol ® TRA*2 | 1.0 |
| Soxinol ® M*2 | 1.5 |

Note:
*1Ethylene-propylene-ethylidene norbornene rubber (produced by Sumitomo Chemical Company, Limited)
*2Vulcanization accelerator (produced by Sumitomo Chemical Company, Limited)

TABLE 10

|  | Comparative Example 10 | Example 10 | Example 11 | Example 12 |
|---|---|---|---|---|
| Irradiation Manner | No irradiation | One direction (FIG. 4) | Two directions (FIG. 1 $\alpha = 45°$) | Three directions (FIG. 2) |
| Irradiation Dose (Mrad) | — | 10 | 10 | 10 |
| Electron Voltage (kV) | — | 250 | 250 | 250 |
| Expanded Article of Rubber |  |  |  |  |
| Surface Appearance*1 | x | o | ⊚ | ⊚ |
| Apparent Specific Gravity | 0.50 | 0.48 | 0.48 | 0.48 |
| Shape-Retaining Ratio*2(%) | 76 | 63 | 95 | 87 |

Note:
*1The surface appearance of the expanded article was rated as follows:
⊚: Excellent
o: Good
x : Poor
*2Shape-retention ratio This is indicated by a ratio of the outer diameter ($d_1$) in the vertical direction of the tube to the outer diameter ($d_2$) in the horizontal direction of the tube: ($d_1/d_2$) × 100 (%). As the ratio is nearer 100%, the properties are better.

EXAMPLES 13 TO 15 AND COMPARATIVE EXAMPLE 11

In these examples, it is shown that the shape-retaining properties of an unexpanded tube-shaped extrudate are improved by irradiating the molding with electron beams.

A rubber composition shown in Table 11 was kneaded in a Banbury mixer and then extruded through a tube-shaped die (die temperature: 100° C.) having an inner diameter of 18 mm and an outer diameter of 20 mm, attached to 45 mmø extruder to produce a tube-shaped extrudate.

The surface of the extrudate was crosslinked by irradiating with electron beams (electron voltage: 500 kV) in order to examine the effect of improvement of shape-retaining properties. The shape-retaining properties were determined by the same method as in examples 10 to 12 after heating the extrudate for 60 minutes in an oven maintained at 120° C. and then cooling it to room temperature.

TABLE 11

| Formulation | Amount (parts by weight) |
| --- | --- |
| Esprene ® 512F* | 85 |
| Esprene ® 601* | 25 |
| FEF carbon black | 120 |
| Paraffin oil | 70 |
| Zinc oxide | 5 |
| Stearic acid | 1 |
| Calcium oxide | 8 |

Note:
*Ethylene-propylene-ethylidene norbornene rubbers (produced by Sumitomo Chemical Company, Limited)

TABLE 12

| | Example | | | Comparative Example |
| --- | --- | --- | --- | --- |
| | 13 | 14 | 15 | 11 |
| Method of Irradiation | Both side portions were irradiated from two directions | | | No irradiation |
| Dose of Irradiation (Mrad) | 10 | 20 | 30 | — |
| Electron Voltage (kV) | 500 | 500 | 500 | — |
| Shape-Retention Ratio (%) | 69 | 87 | 91 | 38 |

It can be seen from the results of Table 12 that the shape-retaining properties of the unvulcanized rubber extrudate are greatly improved by irradiating with 10 to 30 Mrad of electron beams.

EXAMPLE 16 AND COMPARATIVE EXAMPLE 12

Shape-retaining properties at the vulcanization step are described in these examples.

Vulcanizing agents and vulcanization accelerators shown in Table 13 were added to the rubber compositions used in Examples 13 to 15. The resulting composition was extruded in the same manner as in Examples 13 to 15 to obtain a tube-shaped molding. After irradiation with electron beams (electron voltage: 500 kV), the molding was cured at 160° C. for 20 minutes in a hot air oven.

As can be seen from Table 14, the shape-retaining properties are markedly improved over those of Comparative Example 12 in which irradiation with electron beams was not applied.

TABLE 13

| Compound | Amount (part by weight) |
| --- | --- |
| Soxinol ® BZ* | 2 |
| Soxinol ® TT* | 0.8 |
| Soxinol ® TRA* | 0.8 |
| Soxinol ® TE* | 2.5 |
| Soxinol ® M* | 2 |
| Sulfur | 1.5 |

Note:
*Vulcanization accelerator (produced by Sumitomo Chemical Company, Limited)

TABLE 14

| | Example 16 | Comparative Example 12 |
| --- | --- | --- |
| Method of Irradiation | Both side portions were irradiated from two directions. | — |
| Dose of Irradiation (Mrad) | 20 | — |
| Electron Voltage (kV) | 500 | — |
| Shape-Retention Ratio (%) | 93 | 47 |

EXAMPLE 17 AND COMPARATIVE EXAMPLES 13 AND 14

In these examples, it is shown that if the surface layer of a rubber sheet is coated with oil resistant resin and then cured by irradiation with electron beams, an excellent effect can be obtained.

(1) Preparation of Rubber Sheet

TABLE 15

| (Composition) | | |
| --- | --- | --- |
| Ethylene-propylene-ethylidene norbornene rubber compound | | |
| Esprene ® 512F*1 | 100 | parts by weight |
| FEF carbon black | 120 | " |
| Paraffin Oil | 80 | " |
| Zinc oxide | 5 | " |
| Stearic acid | 1 | " |
| Soxinol ® BZ*3 | 2 | " |
| Soxinol ® TT*3 | 0.5 | " |
| Soxinol ® TRA*3 | 0.5 | " |
| Soxinol ® M*3 | 1 | " |
| Sulfur | 1.5 | " |
| Polychloroprene rubber compound | | |
| Neoprene ® W*2 | 100 | parts by weight |
| FEF carbon black | 40 | " |
| Naphthenic oil | 10 | " |
| Stearic acid | 0.5 | " |
| Zinc oxide | 5 | " |
| Magnesium oxide | 5 | " |
| Soxinol ® 22*3 | 0.5 | " |

*1Ethylene-propylene-ethylidene norbornene rubber (produced by Sumitomo Chemical Company, Limited)
*2Polychloroprene rubber (CR rubber) (produced by Showa Neoprene Co., Ltd.)
*3Vulcanization accelerator (produced by Sumitomo Chemical Company, Limited)

The rubber compositions shown in Table 15 were kneaded in a Banbury mixer and a mixing roll and then press cured to produce cured sheets of 15 cm×15 cm having a thickness of 2 mm.

The vulcanization conditions were as follows:

| EPDM composition | 160° C. × 20 minutes |
| --- | --- |
| CR composition | 160° C. × 30 minutes |

(2) Oil Resistant Coating (a) Preparation of Melamine-Acrylic Resin Solution

A mixture of 390 g of hexamethoxymethylmelamine (Sumimal® M-100 produced by Sumitomo Chemical Company, Limited), 480 g of ethylene glycol monoacrylate, and 0.38 g of α-methylhydroquinone was placed in a flask equipped with a stirrer, a thermometer, an evacuating apparatus, and a cooling condenser. Then, 0.9 ml of phosphoric acid (85%) was added, and the mixture was reacted under reduced pressure at 80° to 85° C. When the amount of the distillate reached 128 g, the pressure was returned to atmospheric pressure, and the mixture was cooled. Thus a pale yellow transparent, viscous resin solution was obtained.

(b) Method of Surface Treatment

An undercoating material composed mainly of chlorinated polypropylene (chlorine content: 28%) was spray coated on the cured rubber sheet. Then, a resin composition having the following formulation was coated on the sheet in a thickness of 20 µ.

| Alonix ® S-8030 (polyester acrylate produced by Toagosei Chemical Industry Co., Ltd.) | 50 parts by weight |
|---|---|
| Melamine-acrylic resin solution (prepared in (a) above) | 35 " |
| n-Butyl acrylate | 15 " |
| Benzoin isopropyl ether | 3 " |

(c) Curing with Electron Beams

The sheet was irradiated with 20 Mrad of electron beams at an electron voltage of 160 kV.

(3) Oil Resistance Test

JIS No. 3 oil was used. After allowing to stand in the JIS No. 3 oil at room temperature for 3 weeks, the cured rubber was measured for increase in volume, increase in weight, tensile strength (No. 3 dumbbell defined in JIS K-6301) at the elongation speed of 500 mm/min, and change in hardness.

The results are shown in Table 16.

TABLE 16

| | Comparative Example 13 | Example 17 | Comparative Example 14 |
|---|---|---|---|
| Rubber | EPDM | EPDM | CR |
| Surface Treatment with Curing Agent | No* | Yes | No* |
| Curing Method | — | Electron Beams | — |
| Original Physical Properties | | | |
| $T_B$ (kgf/cm$^2$) | 183 | 183 | 245 |
| $E_B$ (%) | 330 | 330 | 310 |
| $H_S$ (JIS-A) | 70 | 70 | 70 |
| After Oil Resistance Test | | | |
| Increase in Volume (%) | 82 | 4 | 20 |
| Increase in Weight (%) | 68 | 3 | 14 |
| Change in $T_B$ (%) | −40 | −17 | −31 |
| Change in $E_B$ (%) | −48 | −15 | −16 |
| Change in $H_S$ (JIS-A) | −20 | +1 | −10 |

It can be seen from the results of Table 16 that the defect of the ethylene-propylene-ethylidene norbornene rubber, i.e., poor oil resistance, is greatly improved by irradiation with electron beams. Although the polychloroprene rubber is known as an oil resistant rubber, the oil resistance of the ethylene-propylene-ethylidene norbornene rubber sheet treated with the method of the present invention is more increased than the oil resistance of the polychloroprene rubber sheet.

While the invention has been described in detail and with reference to specific embodiments thereof, it will be apparent to one skilled in the art that various changes and modifications can be made therein without departing from the spirit and scope thereof.

What is claimed is:

1. A process for producing an expanded rubber molding having a smooth surface, comprising:

(1) extruding continuously a non-crosslinked rubber molding consisting essentially of a rubber selected from the group consisting of styrene-butadiene rubber, polyisoprene rubber, polychloroprene rubber, acrylonitrile-butadiene rubber, polybutadiene rubber, ethylene-α-olefin rubber, ethylene-α-olefin-non-conjugated diene rubber, natural rubber, chlorinated polyethylene and chlorosulfonated polyethylene, a crosslinking agent selected from the group consisting of sulfur, peroxides and quinoids, and a blowing agent;

(2) irradiating continuously with electron beams at an electron voltage of from 10 kV to 500 kV and at a dose of from 1 Mrad to 30 Mrad to form a crosslinked skin from the surface of the extruded molding of step (1); and (3) heating continuously the resulting molding to perform crosslinking with the crosslinking agent and expansion with the blowing agent simultaneously.

2. A process as claimed in claim 1, wherein the irradiation with electron beams is carried out from at least two directions.

3. A process as claimed in claim 1, wherein the non-crosslinked rubber molding is composed of a rubber having a scorch time of at least 5 minutes.

4. A process as claimed in claim 1, wherein the non-crosslinked rubber molding is a non-crosslinked molding containing an ethylene-α-olefin-nonconjugated diene rubber as a major component.

5. A process as claimed in claim 1, wherein the non-crosslinked rubber molding is a non-crosslinked molding containing an ethylene-propylene-dicyclopentadiene rubber as a major component.

6. An expanded rubber molding having a smooth surface, which is produced by a process comprising:

(1) extruding continuously a non-crosslinked rubber molding consisting essentially of a rubber selected from the group consisting of styrene-butadiene rubber, polyisoprene rubber, polychloroprene rubber, acrylonitrile-butadiene rubber, polybutadiene rubber, ethylene-α-olefin rubber, ethylene-α-olefin-non-conjugated diene rubber, natural rubber, chlorinated polyethylene and chlorosulfonated polyethylene, a crosslinking agent selected from the group consisting of sulfur, peroxides, and quinoids, and a blowing agent;

(2) irradiating continuously with electron beams at an electron voltage of from 10 kV to 500 kV and at a dose of from 1 Mrad to 30 Mrad to form a crosslinked skin from the surface of the extruded molding to step (1); and (3) heating continuously the resulting molding to perform crosslinking with the crosslinking agent and expansion with the blowing agent simultaneously.

7. A process for producing an expanded rubber molding having a smooth surface, consisting essentially of:

(1) extruding continuously a non-crosslinked rubber molding consisting essentially of a rubber selected from the group consisting of styrene-butadiene rubber, polyisoprene rubber, polychloroprene rubber, acrylonitrile-butadiene rubber, polybutadiene rubber, ethylene-α-olefin rubber, ethylene-α-olefin-non-conjugated diene rubber, natural rubber, chlorinated polyethylene and chlorosulfonated polyethylene, a crosslinking agent selected from the group consisting of sulfur, peroxides and quinoids, and a blowing agent;

(2) irradiating continuously with electron beams at an electron voltage of from 10 kV to 500 kV and at a dose of from 1 Mrad to 30 Mrad to form a crosslinked skin from the surface of the extruded molding of step (1); and (3) heating continuously the resulting molding to perform crosslinking with the crosslinking agent and expansion with the blowing agent simultaneously.

8. A process as claimed in claim 7, wherein the irradiation with electron beams is carried out from at least two directions.

9. A process as claimed in claim 7, wherein the non-crosslinked rubber molding is composed of a rubber having a scorch time of at least 5 minutes.

10. A process as claimed in claim 7, wherein the non-crosslinked rubber molding is a non-crosslinked molding containing an ethylene-α-olefin-nonconjugated diene rubber as a major component.

11. A process as claimed in claim 7, wherein the non-crosslinked rubber molding is a non-crosslinked molding containing an ethylene-propylene-dicyclopentadiene rubber as a major component.

12. An expanded rubber molding having a smooth surface, which is produced by a process consisting essentially of:

(1) extruding continuously a non-crosslinked rubber molding consisting essentially of a rubber selected from the group consisting of styrene-butadiene rubber, polyisoprene rubber, polychloroprene rubber, acrylonitrile-butadiene rubber, polybutadiene rubber, ethylene-α-olefin rubber, ethylene-α-olefin-non-conjugated diene rubber, natural rubber, chlorinated polyethylene and chlorosulfonated polyethylene, a crosslinking agent selected from the group consisting of sulfur, peroxides, and quinoids, and a blowing agent;

(2), irradiating continuously with electron beams at an electron voltage of from 10 kV to 500 kV and at a dose of from 1 Mrad to 30 Mrad to form a crosslinked skin from the surface of the extruded molding of step (1); and (3) heating continuously the resulting molding to perform crosslinking with the crosslinking agent and expansion with the blowing agent simultaneously.

* * * * *